(No Model.) 3 Sheets—Sheet 1.
F. N. ELLITHORPE.
MACHINE FOR SORTING OR GRADING FRUIT, &c.
No. 527,953. Patented Oct. 23, 1894.
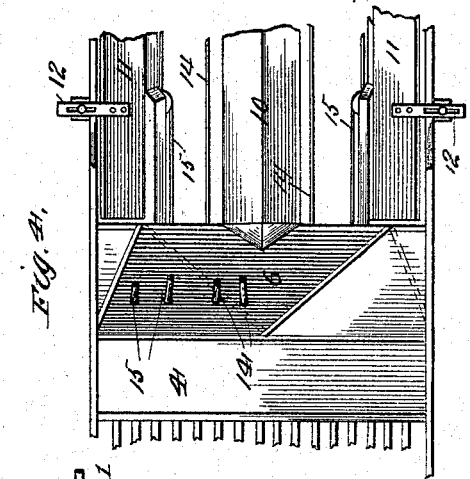
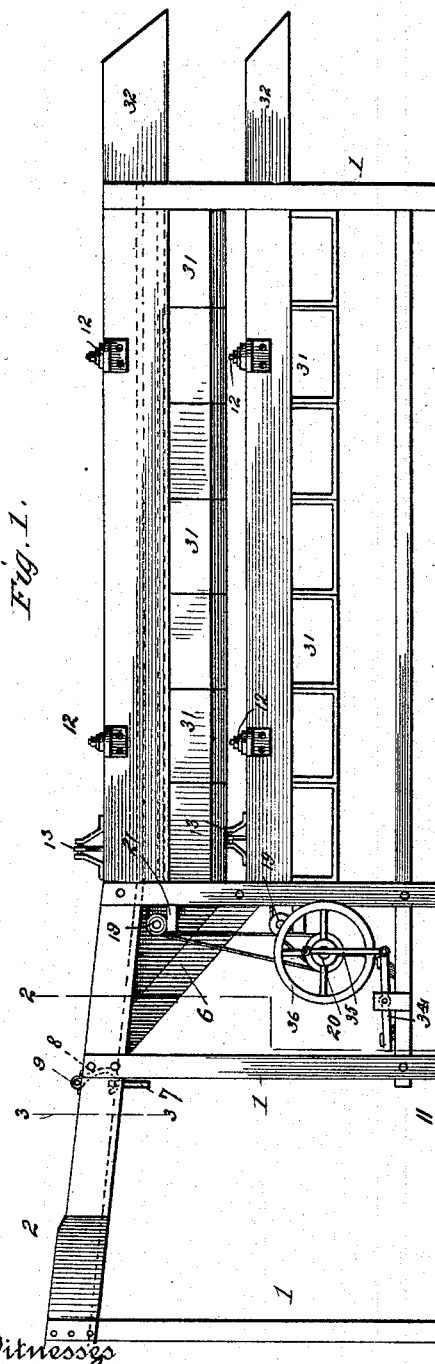
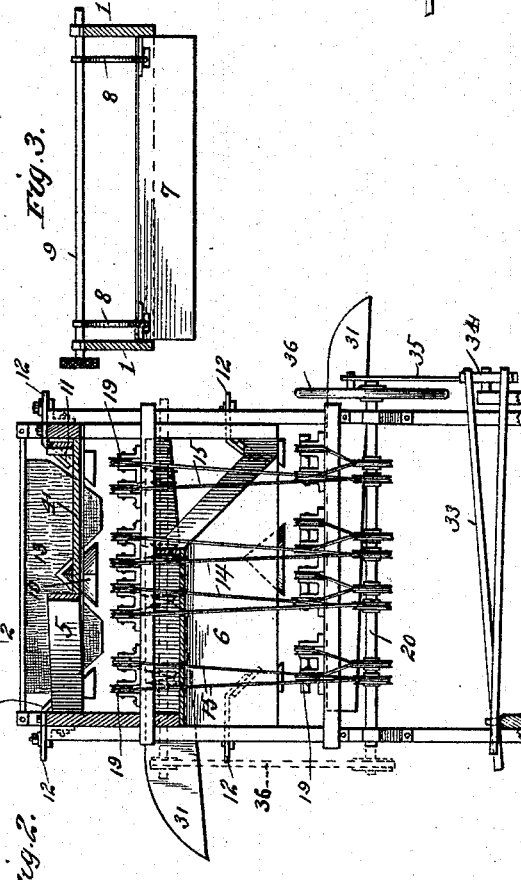

(No Model.) 3 Sheets—Sheet 2.
F. N. ELLITHORPE.
MACHINE FOR SORTING OR GRADING FRUIT, &c.
No. 527,953. Patented Oct. 23, 1894.
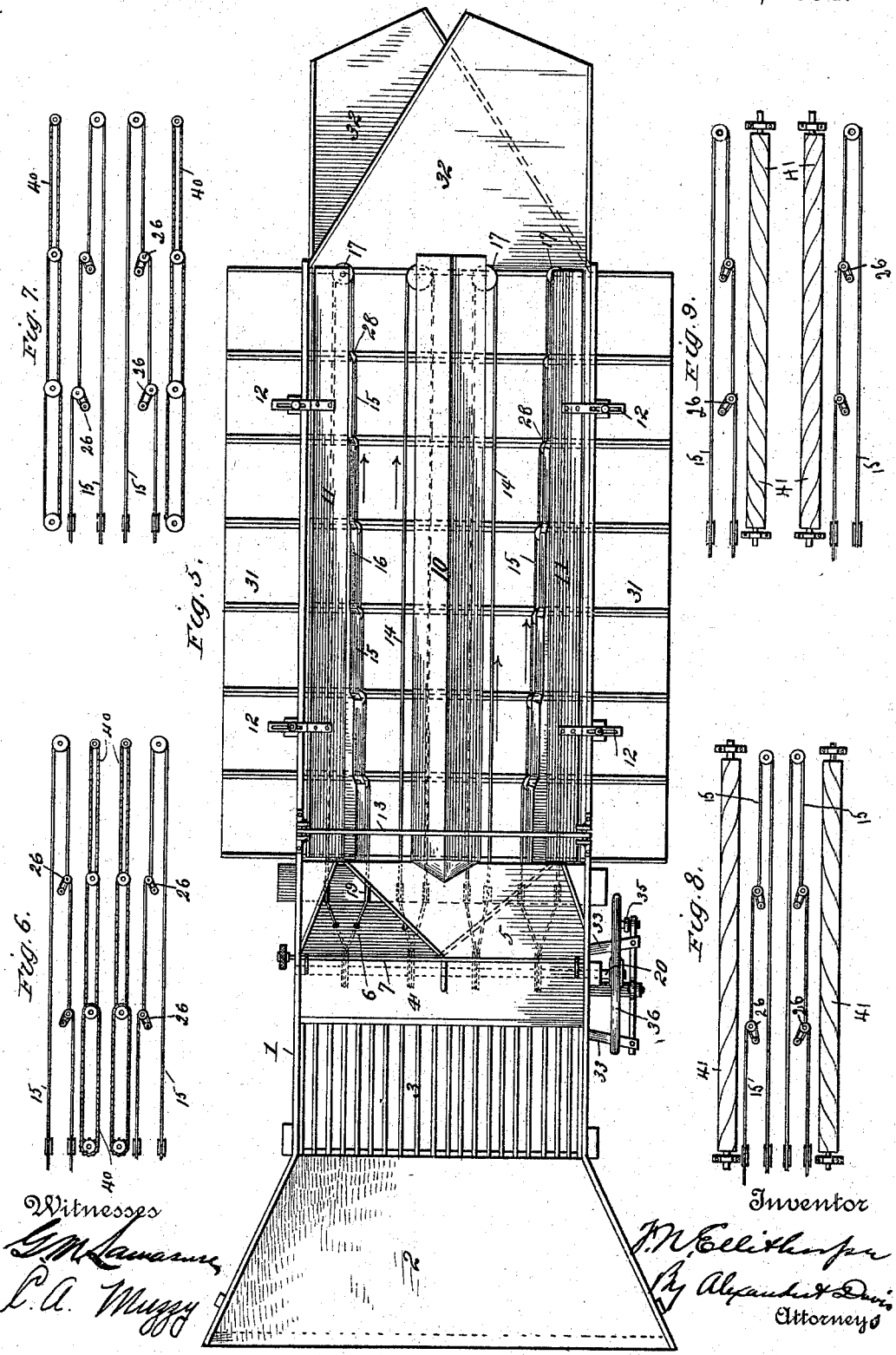
Witnesses
Inventor (No Model.) 3 Sheets—Sheet 3.
F. N. ELLITHORPE.
MACHINE FOR SORTING OR GRADING FRUIT, &c.
No. 527,953. Patented Oct. 23, 1894.
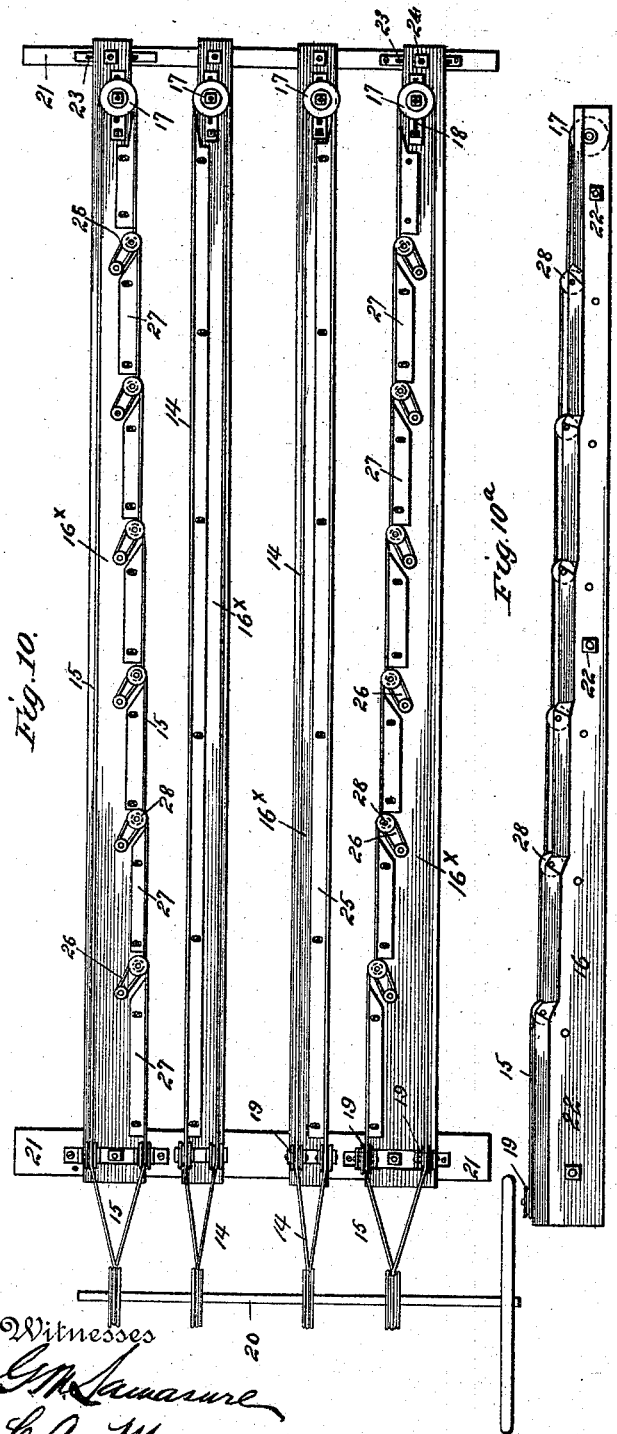

UNITED STATES PATENT OFFICE.

FRANK N. ELLITHORPE, OF PEACHTON, OHIO.

MACHINE FOR SORTING OR GRADING FRUIT, &c.

SPECIFICATION forming part of Letters Patent No. 527,953, dated October 23, 1894.

Application filed January 20, 1894. Serial No. 497,471. (No model.)

*To all whom it may concern:*

Be it known that I, FRANK N. ELLITHORPE, a citizen of the United States, residing at Peachton, in the county of Ottawa and State of Ohio, have invented certain new and useful Improvements in Machines for Sorting or Grading Fruits, &c., of which the following is a specification, reference being had therein to the accompanying drawings, in which—

Figure 1 is a side elevation of the improved machine; Fig. 2, a vertical sectional view thereof taken on the line 2—2 of Fig. 1; Fig. 3, a sectional view taken on the line 3—3 of Fig. 1 and showing the gate; Fig. 4, a plan view of the front end of the lower grading diaphragm; Fig. 5, a plan view of the machine; Figs. 6, 7, 8, and 9, diagrams of modified forms of the grading devices; Fig. 10, a detail plan of one of the grading diaphragms, the covering or protecting plates being removed; Fig. 10$^a$, a detail plan of one member of the grading channels; Fig. 11, a detail transverse section of the upper end of the adjustable member; Fig. 12, a detail cross section of the adjustable member taken at a point along its length; Fig. 13, a detail transverse section of the lower part or bar of one of the members, showing the adjustable plate for assisting in supporting the traveling rope or belt; Fig. 14, a detail plan of the same, showing said adjustable plates and also a modified arrangement of the pulleys carrying the belt or rope, and Fig. 15 a detail cross section of the lower end of the adjustable member.

This invention is designed to provide an improved machine for grading or separating oranges and other fruits as regards their sizes and also for assorting them as regards their color or other characteristics, as fully hereinafter appears.

Referring to the drawings, the numeral 1 designates a suitable frame; 2, a canvas hopper formed at the upper or forward end of the machine; 3, a grating of the usual construction; 4, the assorting-board adjoining the grating and conveying the fruit to the chutes leading to the upper and lower diaphragms; 5, a chute leading to the upper diaphragm; 6, a descending chute leading to the lower diaphragm, and 7 a vertically-movable gate extending transversely of the machine in front of the chutes, said gate working through a slot in the sorting-board and being raised and lowered by means of a pair of hook-shaped arms 8 carried by a transverse shaft 9 and working through openings in the upper edge of the gate, as shown most clearly in Fig. 3.

The upper and lower grading devices are constructed precisely alike and it will be understood that a description of one set of devices will answer for both, the same numerals being used to designate corresponding parts in the two sets of devices.

Each grading diaphragm consists of two channels separated by a central dividing-board 10, having its sides inclined in opposite directions and extending from the chute 5 to the rear end of the frame. To assist the central part 10 in directing the fruit into the grading channels, a downwardly- and inwardly-inclined board 11 is supported along each side of the machine, each of said boards being adjustably connected and supported upon the upper edge of the frame by means of slotted plates 12 and suitable bolts passing therethrough.

Across each diaphragm near the upper end thereof is suspended a flexible retarder 13, which serves to break the force of the incoming fruit and prevent it rolling down the channels too rapidly. To convey the fruit along the channels, a pair of endless belts 14 and 15 are employed for each channel, said belts extending the full length of the channels and being supported a little below the guides 10 and 11 by means of suitable pulleys journaled on vertical shafts between the longitudinal bars 16 and 16$^\times$, one pair of said bars being employed for each endless conveyer.

The conveyers at their rear or lower ends pass around pulleys 17 journaled on a vertical shaft supported between bars 16 and 16$^\times$, said pulleys being each longitudinally adjustable in slotted plates 18 in order that the conveyers may be kept sufficiently taut, and at their upper ends they each pass over a set of vertical pulleys 19 journaled in suitable brackets supported between said bars 16 and 16$^\times$, and from these pulleys 19 the conveyers pass down and around suitable pulleys on a driving shaft 20 journaled in the lower part of the frame.

The longitudinal bars carrying the conveyers are supported at their ends on transverse bars 21 supported in the frame of the machine, and the bars of each pair are connected together and supported the proper distance apart by vertical bolts 22, the bolts being provided with suitable heads and nuts in order that the bars may be adjusted vertically with respect to each other.

In order that the width of the grading channels may be varied, by adjusting one of the conveyers to or from its opposite member, one set of bars of each channel is adjustably supported at its ends upon slotted plates 23 fixed to the transverse bars 21, the clamping bolts 24 passing down through the bars and through said slotted plates, as shown most clearly in Fig. 11.

The inner conveyer of each channel is straight and is supported by the strip 25, adjustably bolted to the under bar 16× and extending out over the edge of the same, and partially under the rearwardly or downwardly-moving part of the conveying cord, as shown most clearly in Fig. 13.

To form a series of rectangular grading openings in each channel, said openings gradually increasing in width from the upper end of the channel to the lower end thereof, a series of loops 26 are formed in each of the conveyers or belts 15, the portions of said belts between the loops being supported by adjustable plates 27 similar to the strips 25. The loops 26 are each formed by carrying the belt first around a horizontal pulley 28 journaled near the inner edges of the bars 16 and 16× and then carrying it around another pulley 29 and from thence around a smaller pulley 30, carried directly under said pulley 28, the belt then passing down the channel to the next pulley 28 and there formed into another loop like the one just described and so on to the end of the channel, each loop enabling a sort of offset to be formed in the belt to make each succeeding opening slightly larger than the preceding opening.

As shown in Fig. 14, the small pulley 30 may be omitted by supporting pulley 29 nearer the inner edges of bars 16× and carrying the belt from said pulley 29 under the inner edge of pulley 28, as shown; and the pulley 28 may have its shaft set on a slight incline if desired in order to raise the inner edge of the pulley and permit the belt to pass freely under it.

Under each diaphragm is arranged a series of laterally-extending spouts 31 which serve to receive the fruit from the different sized openings and convey it out at the side of the machine, and projecting rearwardly from each diaphragm is a tail-spout 32 to receive the fruit that does not pass through the grading openings. As will be seen the number of spouts corresponds to the number of grading openings formed in the channel, and it will also be seen that the number of openings and spouts may be varied to suit the exigencies of the case. As shown, the inner edges of the upper plates or bars 16 are notched or cut out to correspond to the rectangular grading openings, and the upper corners of these cut-out portions are beveled to throw the fruit upon the traveling conveyers. As will also be seen the conveyers of both diaphragms are driven from pulleys on the shaft 20 and some of the conveyers of the upper diaphragm work through openings in the descending chute 6, as shown most clearly in Fig. 2.

Should it be undesirable to pass the upper conveyers down through chutes 6, they may be passed over pulleys on a separate shaft journaled in the frame above said chute and said shaft may be driven by a suitable belt or chain 36 connecting it to the lower shaft, as shown in dotted lines in Fig. 2. If desired the descending chute 6 may be formed of flexible material, such as canvas, to prevent injury to the fruit.

In the diagram shown in Fig. 6, the inner conveyers are formed of a series of sprocket chains 40, suitably mounted, and in Fig. 7 the same arrangement of sprocket chains is shown excepting that the sprocket chains are arranged outside of the conveyers having the looped offsets; and in Figs. 8 and 9 the belt-conveyers are used in connection with suitable longitudinal rollers 41 which may be covered and rotated in order to assist in conveying the fruit.

It will be observed that the looped conveyer may be used in the above combinations and also in others without departing from the scope of the invention.

The shaft 20 may be driven in any suitable manner, but I prefer the devices shown, which consist of a pair of foot-levers 33 connected to the opposite ends of an oscillating bar 34, said bar being connected by means of a pitman 35 to a wrist-pin carried by a balance or fly-wheel 36 on the shaft 20.

As the fruit passes down over the grading and sorting board, the gate being lowered, the operator sorts the fruit by hand and directs one kind into the upper chute and the other kind into the descending chute, and as the fruit passes down the channel it is graded according to size and conveyed by the spout into suitable receiving vessels. It will thus be seen that the fruit may be readily assorted with respect to its color or other characteristics and also graded according to sizes.

The looped conveyers may be used on both sides of channels at the same time, or only one looped conveyer may be used as shown in Fig. 10, but this may be used on either side of channels to suit the case.

It will be clearly seen, that instead of two grading channels, as shown in Fig. 10, the number may be varied, and but one channel used, or more, as the case may be, the other members and parts corresponding. It will also be observed that the inside plates may be made adjustable, and the outside plates stationary, or they may both be made adjustable or both stationary.

When grading fruit that does not require assorting, the lower chute, grading channels, spout conveyers, &c., may be disposed of, and the upper set only used.

Having thus fully described my invention, what I claim, and desire to secure by Letters Patent, is—

1. In a machine for grading oranges, the combination of a grading channel, a chute leading thereto, a hopper connected to the chute, a vertically movable gate working through an opening in the bottom of the chute, a transverse shaft carrying a pair of curved hooks 8, said hooks working in openings in the gate, substantially as described.

2. In a machine for grading and assorting oranges, the combination of a frame, a single hopper, two adjacent chutes leading therefrom, one of the chutes descending and terminating below the other, two grading channels supported one above the other and connected to the respective chutes, a series of troughs supported beneath each grading channel and extending outwardly from the frame, the upper series of troughs projecting out on the opposite side from the other series, whereby the fruit may be graded as to size and assorted as to quality, substantially as described.

3. In a machine for grading fruit, a grading channel consisting of two members, one of said members consisting of an endless cord or belt looped at intervals to form a series of grading-openings, substantially as described.

4. In a machine for grading fruit, a grading-channel consisting of two endless conveyers or belts and pulleys for supporting the same, one of said belts having formed in it at intervals along its length offsets, whereby a series of rectangular grading openings is formed, each successive opening being wider than the preceding opening, substantially as described.

5. In a machine for grading fruit, a grading-channel consisting of two members, one of said members consisting of an endless belt or conveyer, said belt or conveyer having loops 26 formed in it at intervals, pulleys carrying these loops, and means for driving the belt, substantially as described.

6. In a machine for grading fruit, a grading channel consisting of two members, each of said members consisting of a pair of longitudinal bars adjustably connected together and supported one above the other, and an endless conveyer carried by pulleys journaled between the bars, substantially as described.

In testimony whereof I affix my signature in presence of two witnesses.

FRANK N. ELLITHORPE.

Witnesses:
J. W. GAMBLE,
A. J. OWEN.